US009933529B2

(12) United States Patent
Yoshida et al.

(10) Patent No.: US 9,933,529 B2
(45) Date of Patent: Apr. 3, 2018

(54) LAYERED THREE-DIMENSIONAL RADIATION POSITION DETECTOR

(71) Applicant: NATIONAL INSTITUTES FOR QUANTUM AND RADIOLOGICAL SCIENCE AND TECHNOLOGY, Chiba-shi, Chiba (JP)

(72) Inventors: Eiji Yoshida, Chiba (JP); Taiga Yamaya, Chiba (JP)

(73) Assignee: NATIONAL INSTITUTES FOR QUANTUM AND RADIOLOGICAL SCIENCE AND TECHNOLOGY, Chiba (JP)

( * ) Notice: Subject to any disclaimer, the term of this patent is extended or adjusted under 35 U.S.C. 154(b) by 0 days.

(21) Appl. No.: 15/474,514

(22) Filed: Mar. 30, 2017

(65) Prior Publication Data
US 2017/0285184 A1  Oct. 5, 2017

(30) Foreign Application Priority Data

Mar. 31, 2016  (JP) .................. 2016-073372

(51) Int. Cl.
 *G01T 1/20*  (2006.01)
(52) U.S. Cl.
 CPC .......... *G01T 1/2018* (2013.01); *G01T 1/2002* (2013.01)
(58) Field of Classification Search
 CPC ..................... G01T 1/2018; G01T 1/2002
 See application file for complete search history.

(56) References Cited

U.S. PATENT DOCUMENTS 6,288,399 B1 *  9/2001  Andreaco .............. G01T 1/1642
                                                250/363.03
7,087,905 B2 *  8/2006  Murayama ............ G01T 1/2008
                                                250/363.03
(Continued)

FOREIGN PATENT DOCUMENTS

JP   H11-142523 A   5/1999
JP   H11-142524 A   5/1999
(Continued)

OTHER PUBLICATIONS

Schmand, M. et al. "Performance results of a new DOI detector block for a High Resolution PET—LSO Research Tomograph HRRT," IEEE Trans. on Nucl. Sci., vol. 45, No. 6 pp., 3000-3006, Dec. 1998.

(Continued)

*Primary Examiner* — Christine Sung
(74) *Attorney, Agent, or Firm* — Oliff PLC

(57) ABSTRACT

A layered three-dimensional radiation position detector includes two-dimensional scintillator arrays that are pixelated by optically discontinuous surfaces and stacked on a light receiving surface of a light receiving element, responses of scintillator elements detecting radiations being made identifiable on the light receiving surface to obtain a three-dimensional radiation detection position. A scintillator array lying on a radiation incident surface side has a pixel pitch smaller than that of a scintillator array lying on a light receiving element side so that the scintillator array on the radiation incident surface side has increased resolution. A layered three-dimensional radiation position detector achieving both low cost and high resolution can thus be provided.

8 Claims, 8 Drawing Sheets

(56) References Cited

U.S. PATENT DOCUMENTS

| | | | |
|---|---|---|---|
| 7,709,801 B2* | 5/2010 | Ooi | G01T 1/1644 250/361 R |
| 2009/0159804 A1* | 6/2009 | Shibuya | G01T 1/2985 250/363.03 |
| 2011/0101229 A1* | 5/2011 | Inadama | G01T 1/1644 250/367 |
| 2014/0231655 A1* | 8/2014 | Dueppenbecker | G01T 1/2985 250/366 |

FOREIGN PATENT DOCUMENTS

| | | | |
|---|---|---|---|
| JP | 2004-279057 A | 10/2004 | |
| JP | 5011590 B2 | 8/2012 | |
| JP | 2015-087260 A | 5/2015 | |
| WO | 2010041313 A1 | 4/2010 | |
| WO | WO 2016015061 A1 * | 1/2016 | G01T 1/2985 |

OTHER PUBLICATIONS

Tsuda, T. et al. "A Four-Layer Depth of Interaction Detector Block for Small Animal PET," IEEE Trans. Nucl. Sci., vol. 51, No. 5, pp. 2537-2542, Oct. 2004.

Moriya, T. et al. "Development of PET Detectors Using Monolithic Scintillation Crystals Processed With Sub-Surface Laser Engraving Technique," IEEE Trans. Nucl. Sci., vol. 57, No. 5, pp. 2455-2459, Oct. 2010.

Sanchez, F. "Small animal PET scanner based on monolithic LYSO crystals: Performance evaluation," Med. Phys., vol. 39, p. 643, Feb. 2012.

* cited by examiner

ANGER CALCULATION $$X = \frac{(A+B)-(C+D)}{A+B+C+D}$$

$$Y = \frac{(A+C)-(B+D)}{A+B+C+D}$$

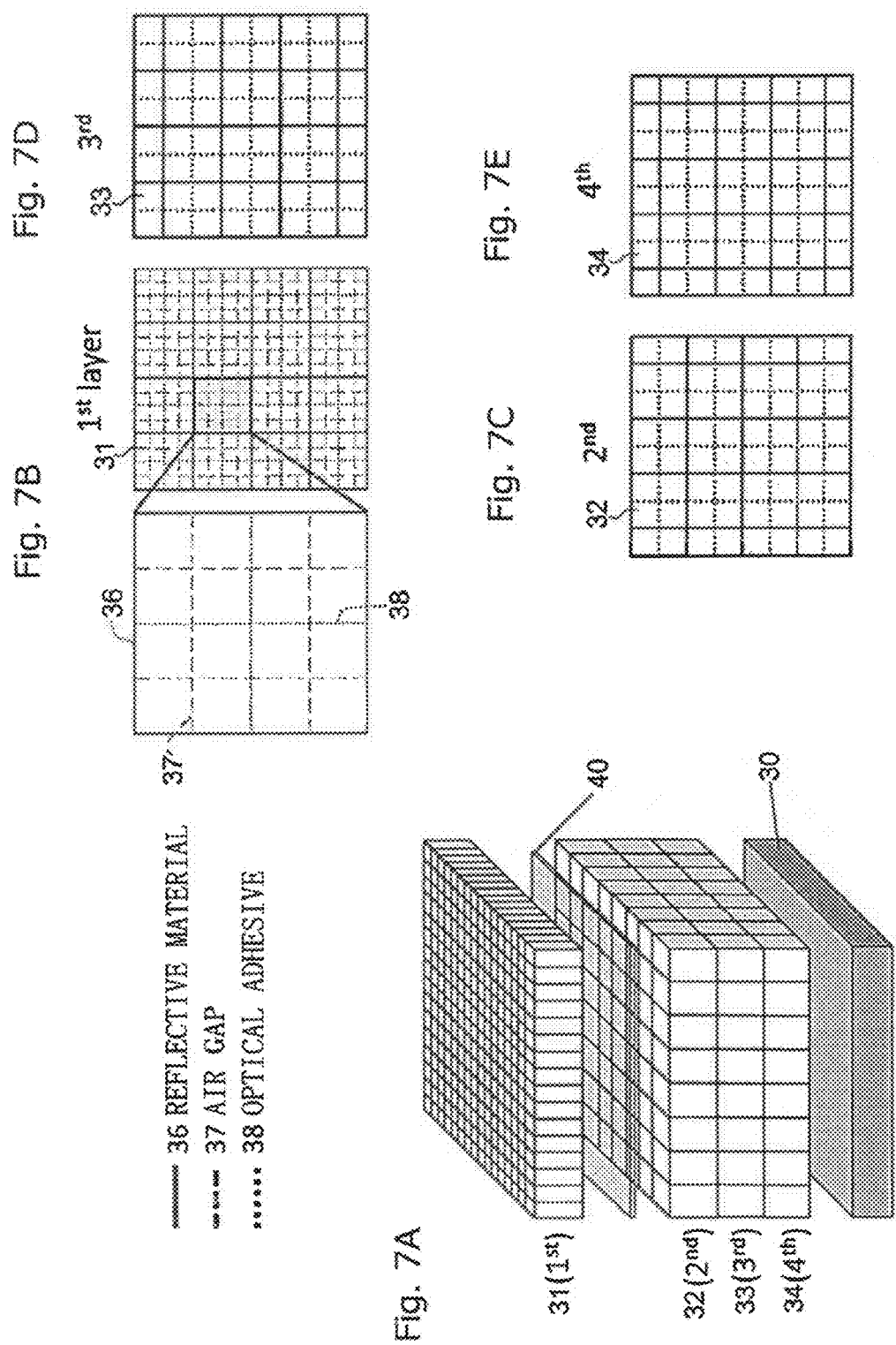

WITHOUT LIGHT GUIDE

WITH LIGHT GUIDE ized on a barycentric map 35 without overlap.
LAYERED THREE-DIMENSIONAL RADIATION POSITION DETECTOR

CROSS-REFERENCE TO RELATED APPLICATION

The disclosure of Japanese Patent Application No. 2016-073372 filed on Mar. 31, 2016 including specifications, drawings and claims is incorporated herein by reference in its entirety.

TECHNICAL FIELD

The present invention relates to a layered three-dimensional radiation position detector, and more particularly to a layered three-dimensional radiation position detector suitable for use in the fields of nuclear medicine imaging such as a positron imaging device and a positron emission tomography (PET) device and radiation measurement.

BACKGROUND ART

A radiation position detector typically includes an array of scintillator elements (such as crystals) and a light receiving element optically coupled thereto. To enhance the spatial resolution of a PET device, the sectional sizes of the scintillator elements with respect to the incident surface of the radiations need to be reduced. The image quality of the PET device therefore depends largely on the sectional sizes of the scintillator elements.

Commercial PET devices include scintillator elements having a sectional size of approximately 4 mm square. As shown in FIG. 1, an arrayed scintillator includes an optical reflective material (hereinafter, may be referred to simply as reflective material) 26 interposed between scintillator elements (detection elements) 20 to control light occurring from interaction with gamma rays. The crystals are discriminated on a barycentric map 35 generated from outputs of a light receiving element 30 by an Anger calculation.

As shown in FIG. 2, to detect a pair of annihilation radiations (also referred to as a line of response) 12 and 14 emitted from inside a body 10 in opposite directions by PET detectors 16 and 18 with high probability, scintillator elements having a thickness of approximately 2 to 3 cm are needed. However, such a thickness can degrade the spatial resolution with respect to obliquely-incident annihilation radiations. Some PET devices then use a three-dimensional position detector capable of detecting a depth of interaction position (Japanese Patent Application Laid-Open No. Hei. 11-142523 (hereinafter, Patent Literature 1), Japanese Patent Application Laid-Open No. Hei. 11-142524 (hereinafter, Patent Literature 2), and Japanese Patent Application Laid-Open No. 2004-279057 (hereinafter, Patent Literature 3)).

There have been proposed various methods for identifying a scintillator crystal of a radiation three-dimensional position detector. One of the most common methods for a layered three-dimensional position detector including three-dimensionally stacked scintillator crystals is one in which two types of scintillator arrays having respective different characteristics are stacked and depth information is identified by waveform analysis (M. Schmand, L. Eriksson, M. E. Casey, M. S. Andreaco, C. Melcher, K. Wienhard, G. Flugge, and R. Nutt, "Performance results of a new DOI detector block for a High Resolution PET-LSO Research Tomograph HRRT," IEEE Trans. Nucl. Sci., vol. 45, no. 6, pp. 3000-3006, 1998 (hereinafter, Non-Patent Literature 1)).

As shown in FIG. 3, layered three-dimensional radiation position detectors (Japanese Patent No. 5011590 (hereinafter, Patent Literature 4) and T. Tsuda, H. Murayama, K. Kitamura, T. Yamaya, E. Yoshida, T. Omura, H. Kawai, N. Inadama, and N. Orita, "A Four-Layer Depth of Interaction Detector Block for Small Animal PET," IEEE Trans. Nucl. Sci., vol. 51, no. 5, pp. 2537-2542, 2004 (hereinafter, Non-Patent Literature 2)) have been proposed which detect depth position information by controlling a distribution of scintillation light by an optical reflective material (may be referred to simply as reflective material) 26 and an optical adhesive 28 so that responses of three-dimensionally stacked scintillator arrays (in FIG. 3, four layers) 21 to 24 are projected on a barycentric map 35 without overlap.

To reduce manufacturing cost, a method for machining the interior of the scintillators by using a laser beam (T. Moriya, K. Fukumitsu, T. Sakai, S. Ohsuka, T. Okamoto, H. Takahashi, M. Watanabe, and T. Yamashita, "Development of PET Detectors Using Monolithic Scintillation Crystals Processed With Sub-Surface Laser Engraving Technique," IEEE Trans. Nucl. Sci., vol. 57, no. 5, pp. 2455-2459, 2010 (hereinafter, Non-Patent Literature 3)) and a method for identifying an interaction position from a distribution of scintillator light on a light receiving surface by using a non-arrayed single scintillator block (F. Sanchez, L. Moliner, C. Correcher, A. Gonzalez, A. Orero, M. Carles, A. Soriano, M. J. Rodriguez-Alvarez, L. A. Medina, F. Mora, and J. M. Benlloch, "Small animal PET scanner based on monolithic LYSO crystals: Performance evaluation," Med. Phys., vol. 39, p. 643, n/a 2012 (hereinafter, Non-Patent Literature 4)) have also been proposed.

SUMMARY OF INVENTION

Technical Problem

As described above, to improve the image quality of PET, smaller scintillator elements need to be used. However, the use of small scintillator elements has a technical problem with identifying each individual scintillator element and a problem of manufacturing cost.

In particular, PET is expected to be used for diagnosis and research of mental and neurotic disorders, such as Alzheimer's disease. The applicant has proposed a helmet type PET device in Japanese Patent Application Laid-Open No. 2015-087260 (hereinafter, Patent Literature 5). Head PET devices need high resolution, even compared to whole body cancer screening. Such high resolution has not been able to be accommodated heretofore.

In Re-Publication of PCT International Publication No. 2010-041313 (claim 8, paragraph 0045, and FIG. 13) (hereinafter, Patent Literature 6), the applicant has proposed to configure the crystals in the lowermost layer closest to the light receiving element to have a size twice that of the crystals in upper two layers. Such a configuration is intended to improve the sensitivity of the lowermost layer, not to improve the resolution of a layer close to the radiation incident surface like the present invention.

Solution to Problem

The present invention has been made to solve the foregoing conventional problems. It is an object of the present invention to provide a layered three-dimensional radiation position detector that achieves both low cost and high resolution.

To solve the foregoing problems, the present invention provides a layered three-dimensional radiation position detector that achieves both low cost and high resolution, in which, as shown in FIGS. 4A and 4B, scintillator elements having a sectional size smaller than that of scintillator elements in other layers are preferably used in the first layer from a radiation incident surface side.

In FIG. 4A, examples of a layered three-dimensional radiation position detector in which the first layer and the second layer of a two-layer DOI detector have uniform thicknesses and nonuniform thicknesses are shown in the left part. Examples in which the first layer and the second and third layers of a three-layer DOI detector have uniform thicknesses and nonuniform thicknesses are shown in the center part. Examples in which the first layer and the second to fourth layers of a four-layer DOI detector have uniform thicknesses and nonuniform thicknesses are shown in the right part. FIG. 4B shows examples in which the sectional size of the first layer is ¼, ½, and ⅑ that of the other layers, respectively.

The conventional layered three-dimensional radiation position detector (Non-Patent Literature 2) identifies four scintillator elements surrounded by the reflective material on the basis of air and optical adhesion. If, for example, the scintillator elements in the first layer are configured to be ¼ in sectional size, 4×4=16 scintillator elements need to be identified without using the reflective material. To identify the scintillator elements of the first layer, for example, the four center elements of the 4×4 scintillator elements are optimized for optical adhesion, and the peripheral elements are optimized for an air gap. It is confirmed that a light guide can be used between the first and second layers, if needed, to improve the discrimination performance of the scintillator elements in the first layer.

The present invention has been achieved on the basis of the foregoing experimental results to solve the foregoing problems by the provision of a layered three-dimensional radiation position detector including two-dimensional scintillator arrays that are pixelated by optically discontinuous surfaces and stacked on a light receiving surface of a light receiving element, responses of scintillator elements detecting radiations being made identifiable on the light receiving surface to obtain a three-dimensional radiation detection position, wherein a scintillator array lying on a radiation incident surface side of high detection efficiency has a pixel pitch smaller than that of a scintillator array lying on a light receiving element side of low detection efficiency so that the scintillator array on the radiation incident surface side has increased resolution.

The scintillator array having the smaller pixel pitch may be arranged on a first layer on the radiation incident surface side.

The scintillator array may be stacked 3 or more layers.

The scintillator array on the light receiving element side may be a plurality of scintillator arrays having the same pixel pitch.

Four layers of the scintillator arrays may be stacked, and a first layer of the four layers on the radiation incident surface side may have a pixel pitch smaller than that of the three layers of the scintillator arrays on the light receiving element side.

The scintillator array of the first layer on the radiation incident surface side may be an array of 16×16 scintillator elements, and an optical reflective material may be inserted for every 4×4 scintillator elements.

The scintillator arrays of the second to fourth layers may be configured by a stack of three layers of arrays of 8×8 scintillator elements having a size twice that of the scintillator elements of the first layer.

A light guide may be inserted between the scintillator arrays between which the pixel pitch changes, so that scintillation light from a scintillator array having a different pixel pitch spreads through the scintillator elements of the adjoining lower layer.

The scintillator array on the radiation incident surface side may have a pixel pitch 1/n (n is a natural number of 2 or greater) of that of the scintillator array on the light receiving element side in a longitudinal direction and/or a lateral direction.

A radiation incident position on the scintillator array having the smaller pixel pitch may be made identifiable on the light receiving surface by a layout pattern of an air gap and/or an optical adhesion layer.

The scintillator elements in each layer may have an arbitrarily selected thickness.

The present invention is applicable regardless of the type of scintillators. Different types of scintillators may be used layer by layer even for purposes other than waveform analysis.

FIG. 5 shows by comparison the effects of a conventional four-layer radiation three-dimensional position detector and an embodiment of the present invention in which a first-layer scintillator array 31 has a ¼ sectional size. According to the conventional method shown in the left part of FIG. 5, a perpendicularly incident gamma ray traces a line of response of the same width regardless of which scintillator element to interact with. According to the method of the present invention shown in the right part of FIG. 5, a line of response between the first layers has a width one half that of the conventional method, and thus the spatial resolution improves. A line of response between the first layer and the second or subsequent layer is expected to provide a similar effect but with lower spatial resolution. For example, if a 3-cm-thick GSO scintillator is equally divided into four layers, the detection efficiency of the first layer (7.5 mm in thickness) with respect to a gamma ray of 511 keV is found to be approximately 40% by experiment. The probability that an interaction with the first layer is involved with coincidence counting is approximately 80%. In the layered three-dimensional radiation position detector, the scintillator elements of the first layer having the highest detection efficiency are therefore preferably configured to have a sectional size smaller than that of the scintillator elements of the other layers. The position discriminability of the detector thereby improves significantly to improve the image quality of PET without much increase in cost.

FIG. 6 shows spatial resolution calculated by a Monte Carlo simulation simulating a 25-cm-diameter small animal PET device using detectors with LSO scintillators of 1.5× 1.5×5 mm$^3$ in the first layer and LSO scintillators of 3×3×5 mm$^3$ in the second to fourth layers. Results of conventional examples in which all the scintillators had a size of 3×3×5 mm$^3$ and 1.5×1.5×5 mm$^3$ are also shown. The 3×3×5-mm$^3$ scintillator arrays and the 1.5×1.5×5-mm$^3$ scintillator arrays had a difference of 0.73 mm in spatial resolution. The method of the present invention showed a difference of 0.4 mm. The method of the present invention can provide a spatial resolution improvement effect of 55% by only replacing one layer (25%) of scintillators with 1.5×1.5×5-mm$^3$ ones.

The foregoing and other new aspects and advantages of the present invention will become apparent from the following detailed description of the preferred embodiment.

BRIEF DESCRIPTION OF DRAWINGS

The preferred embodiments will be described with reference to the drawings, wherein like elements have been denoted throughout the figures with like reference numerals, and wherein;

FIGS. 7A to 7E are diagrams showing an embodiment of the present invention;

DESCRIPTION OF EMBODIMENTS

Embodiments of the present invention will be described below in detail with reference to the drawings. It should be noted that the present invention is not limited to the contents described in the following embodiments and practical examples. The components of the embodiments and practical examples described below may include ones easily conceivable by those skilled in the art, substantially identical ones, and ones within the range of equivalency. The components disclosed in the embodiments and practical examples described below may be combined as appropriate, and may be selected and used as appropriate.

Figure 1:
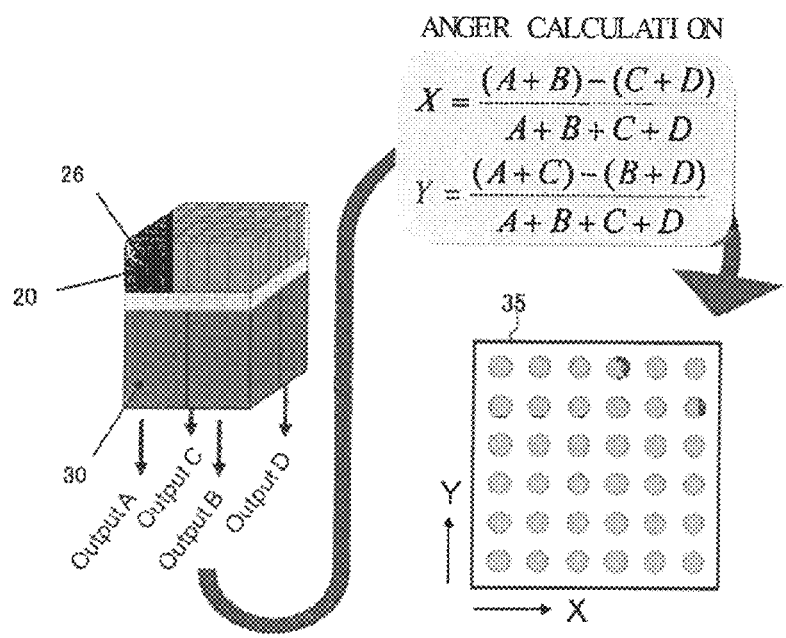
FIG. 1 is a diagram showing a crystal identification method by a typical PET detector and barycenter calculation.
Figure 2:
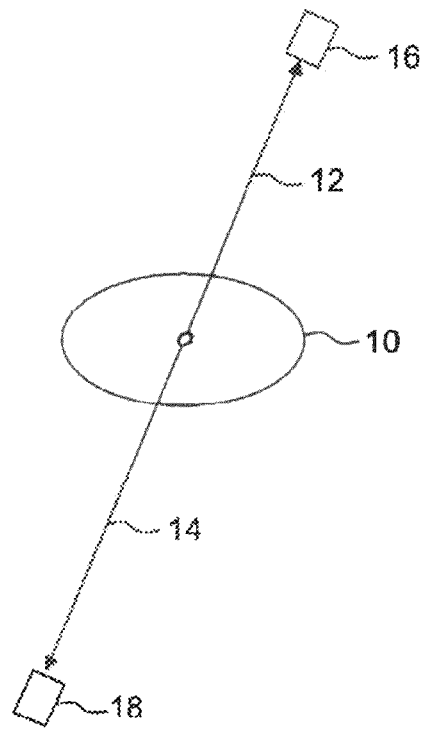
FIG. 2 is a sectional view showing a state in which annihilation radiations are detected by a PET device.
Figure 3:
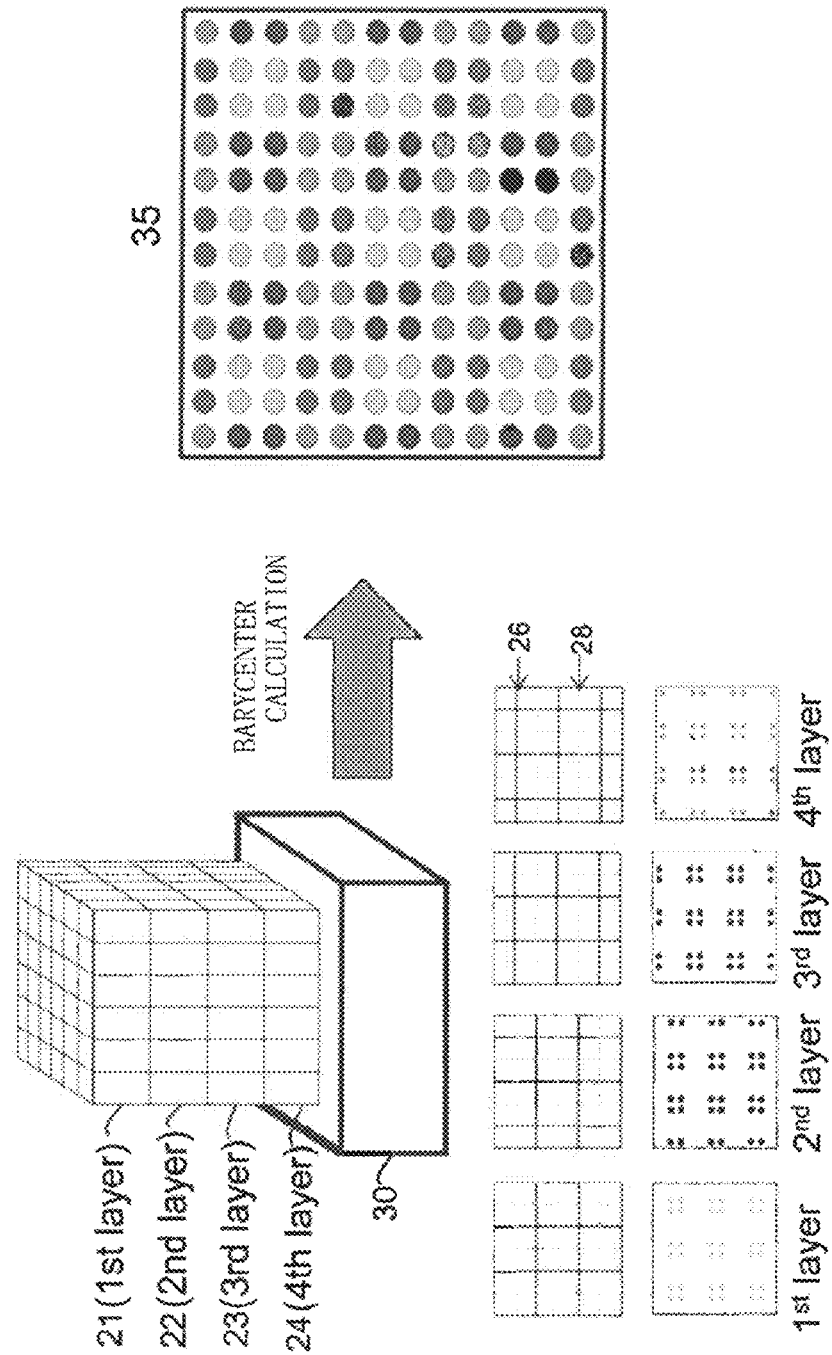
FIG. 3 is a diagram showing an example of a structure and a crystal discrimination method of a conventional layered three-dimensional radiation position detector.

FIGS. 7A to 7E show an embodiment of the present invention which is applied to the four-layer radiation three-dimensional position detector shown in FIG. 3.

In the present embodiment, a first-layer scintillator array 31 on a radiation incident surface side has a pixel pitch ½ that of the other three layers (second, third, and fourth layers) of scintillator arrays 32, 33, and 34 on a light receiving element 30 side of low detection efficiency in both a longitudinal direction and a lateral direction. A light guide 40 is inserted between the first-layer scintillator array 31 and the second-layer scintillator array 32. The light guide and the scintillator arrays can be optically coupled by an optical adhesive and the like.

For example, the first-layer scintillator array 31 as shown in FIG. 7B may be an array of 16×16 LYSO scintillator elements each having 1.5×1.5×5 mm³.

In the first layer of scintillator elements, an optical reflective material 36 is inserted for every 4×4 LYSO scintillator elements. The scintillator elements inside the optical reflective material 36 are optimized by an optical adhesive 38 and air gaps 37 so that their crystal responses on the light receiving surface do not overlap. Specifically, as shown in the diagram, the four center elements of the 4×4 scintillator elements are preferably bonded by the optical adhesive 38.

The peripheral elements are preferably separated by air gaps 37. However, such a configuration is not restrictive.

As shown in FIGS. 7A, 7C to 7E, the second- to fourth-layer scintillator arrays 32 to 34 are a stack of three arrays of 8×8 LGSO scintillator elements each having 3×3×5 mm³. The structure of the reflective material 36 and other factors are the same as with the conventional four-layer radiation three-dimensional position detector shown in FIG. 3.

Figure 8A:
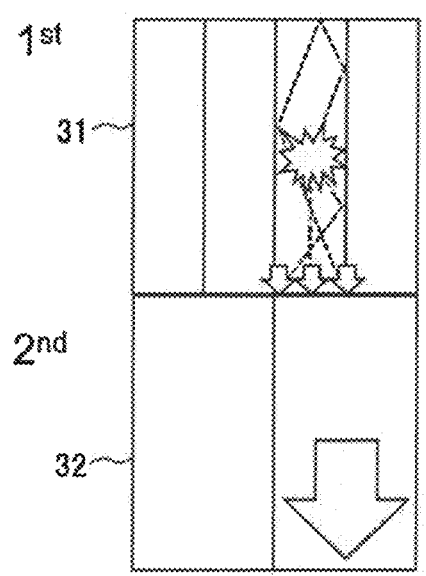
FIGS. 8A and 8B are diagrams showing an effect of an interlayer light guide.
Figure 8B:
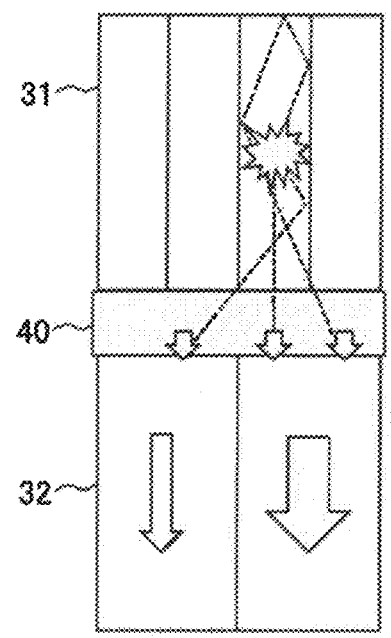

The light guide 40 is interposed between the first and second layers. The light guide 40 is preferably made of an acrylic resin, and has the same size as that of the scintillator arrays (the foregoing arrays have a size of 23×23 mm²) and a thickness of 0.5 mm. Basically, increasing the thickness of the light guide cause deterioration of overall position discrimination. Decreasing the thickness of the light guide cause deterioration of distributing effect. Inventors have tried thicknesses of 0.5 mm, 1.0 mm, 1.5 mm and 2.0 mm. All thicknesses show effect of the light guide, but 0.5 mm is best for position discrimination. However, this is not restrictive. FIGS. 8A and 8B shows an effect of the interlayer light guide 40.

Figure 9B:
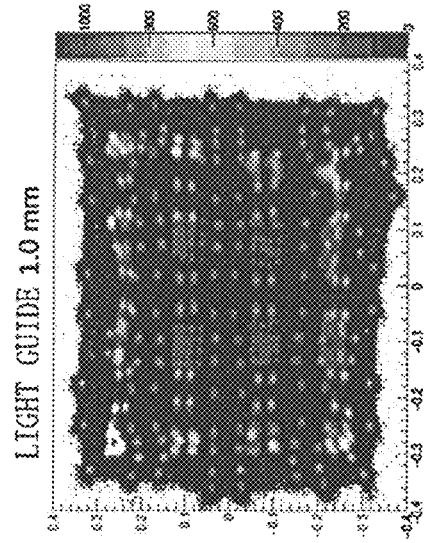
FIGS. 9A to 9C are diagrams showing barycentric maps obtained by the embodiment.
Figure 9C:
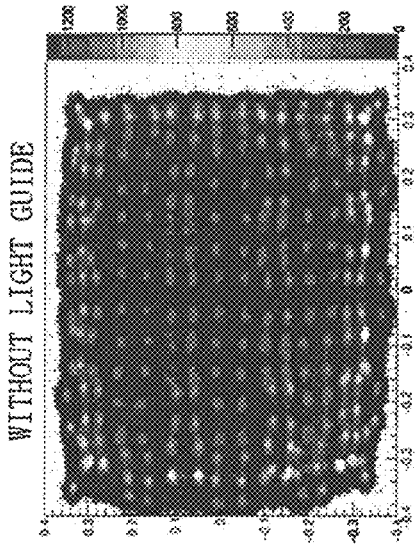
Figure 9A:
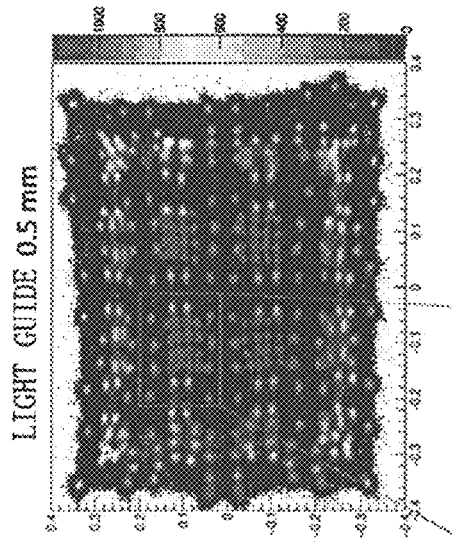

FIGS. 9A to 9B show barycentric maps obtained by uniform irradiation with a $^{22}$Na radiation source from above. It can be seen that the insertion of the light guide between the first and second layers improves the identification of the first layer. Under the condition, the optimum thickness of the light guide is 0.5 mm. A thickness of 1 mm tended to produce overlapping responses. On the barycentric map with the 0.5-mm-thick light guide, it is evident that the responses of the 16 elements in the first layer within the minimum segment shown enlarged in FIG. 7B and four elements in each of the second and third layers are identifiable.

In the foregoing embodiment, the scintillator arrays are pixelated by crystal division. However, the scintillator arrays may be pixelated by laser engraving to a monolithic crystal or by laser engraving to divided crystals.

In the foregoing embodiment, only the first layer on the radiation incident surface side has a pixel pitch smaller than that of the other layers. However, up to predetermined layers from the radiation incident surface may have a pixel pitch smaller than that of the rest of the layers.

Figure 4A:
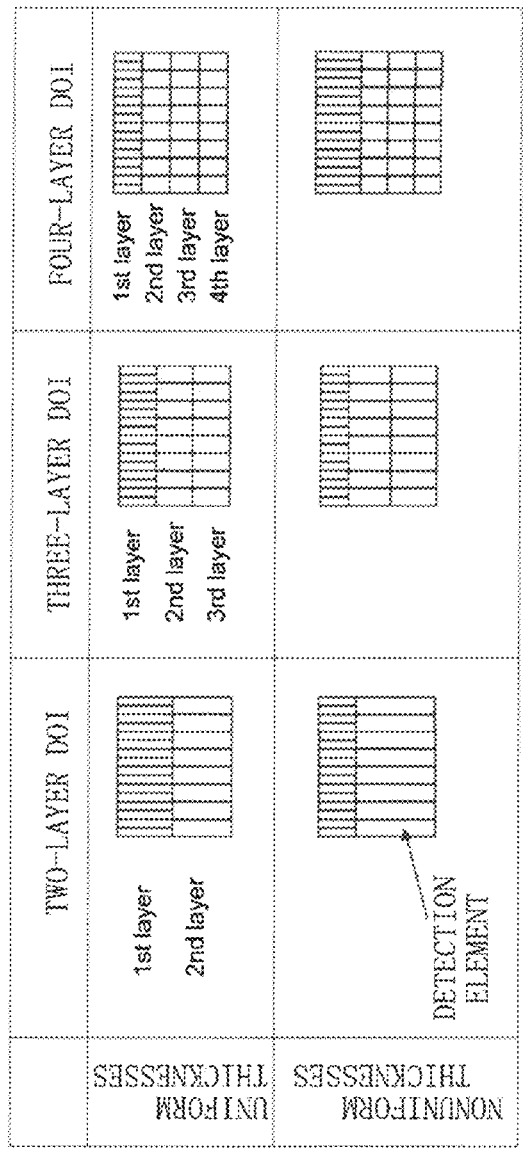
FIGS. 4A and 4B are diagrams showing a structural example of a layered three-dimensional radiation position detector according to the present invention.
Figure 4B:
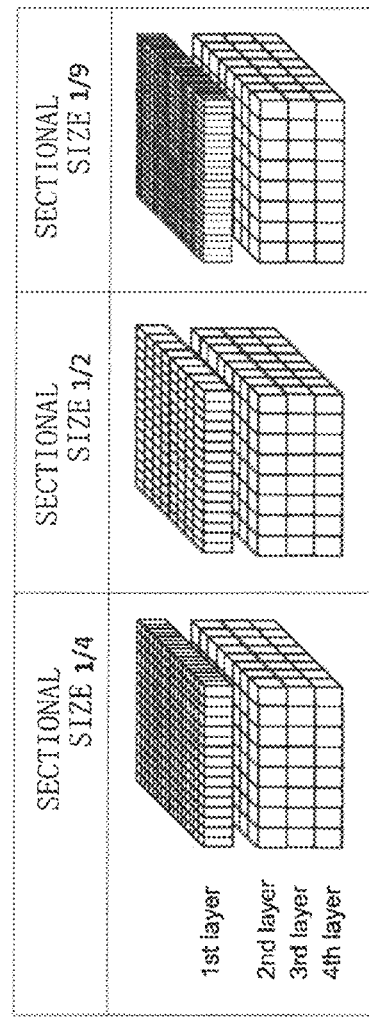
Figure 5:
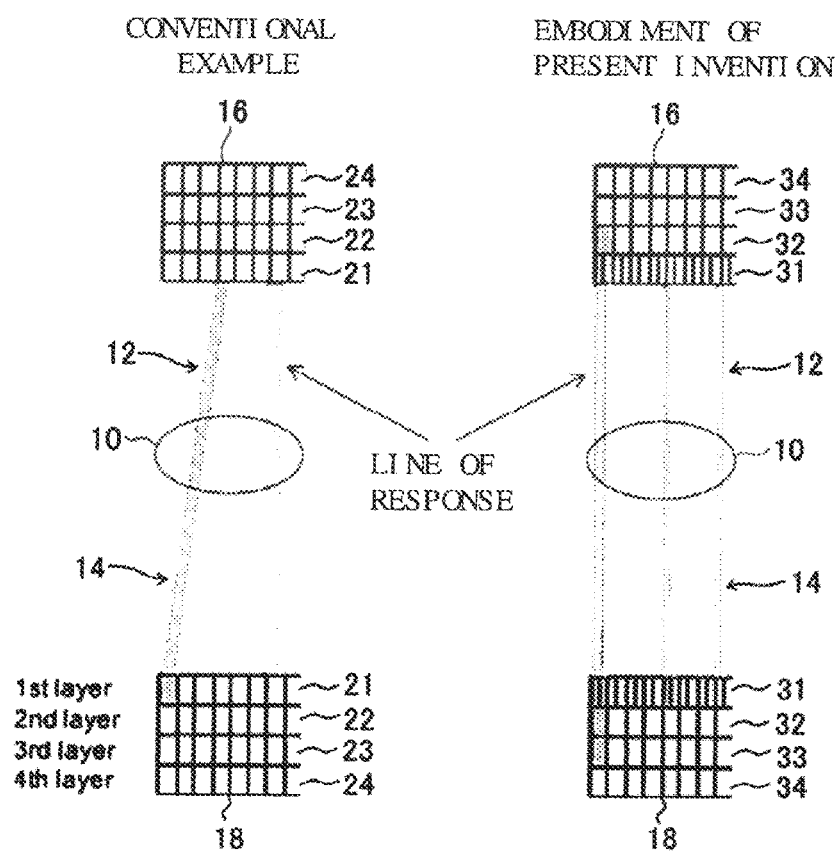
FIG. 5 is a diagram showing by comparison the effects of a conventional example and an embodiment of the present invention.
Figure 6:
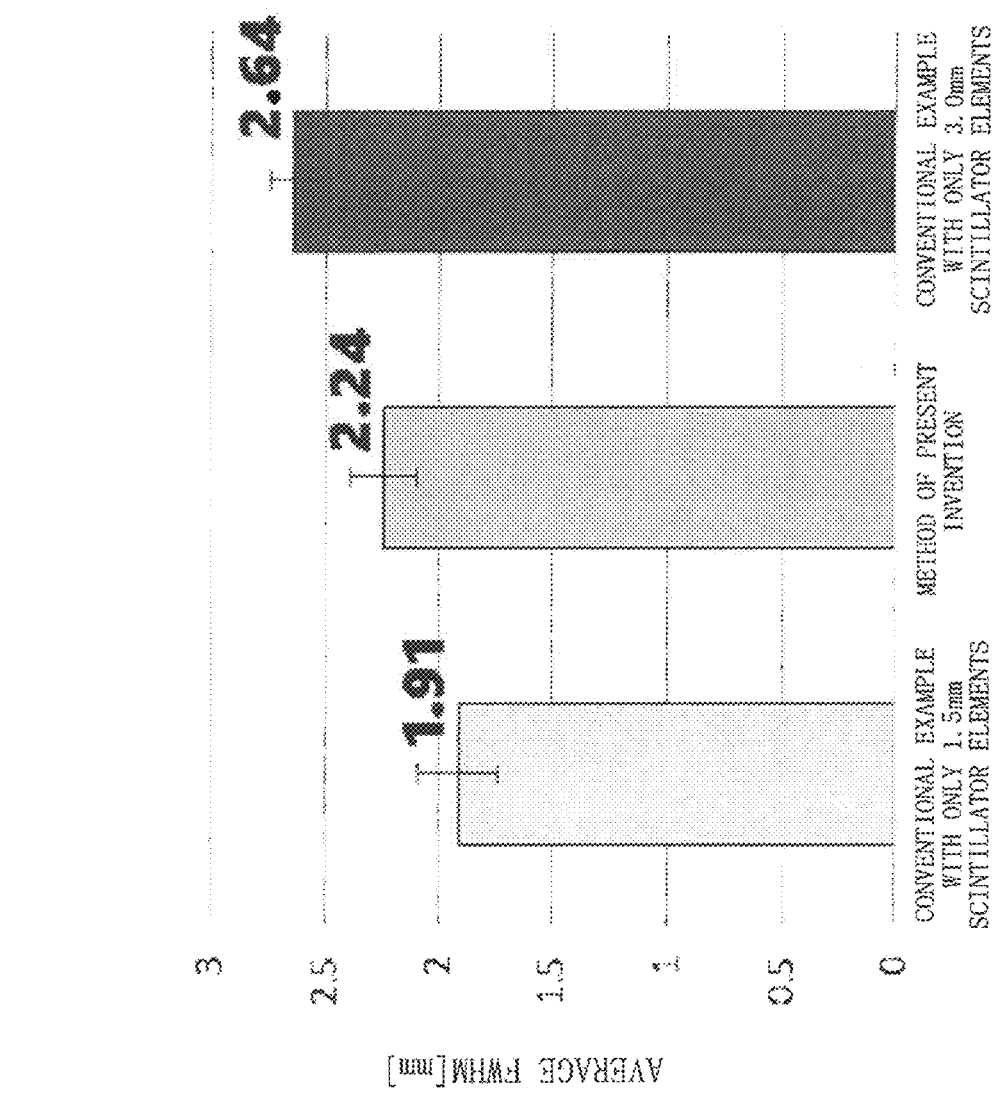
FIG. 6 is a diagram showing predicted spatial resolution of the conventional example and the method of the present invention.

In the foregoing embodiment, the first layer on the radiation incident surface side has a pixel pitch ½ that on the light receiving element side in both the longitudinal direction and the lateral direction. As shown in FIG. 4B, the pixel pitch may be reduced to ½ in either one of the longitudinal and lateral directions. The pixel pitch may be reduced to other than ½ but 1/n (n is a natural number of 3 or greater) in the longitudinal direction and/or the lateral direction.

The number of layers of scintillator arrays is not limited to four. As shown in FIG. 4A, the number of layers may be two or more.

The material of the scintillators is not limited to that of the embodiment.

According to the present invention, resolution of the order of 4 mm of an existing PET device can be improved to the order of 2 mm without much increase in cost. Head PET devices including the helmet type PET device proposed in Patent Literature 5 can thus be accommodated.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

The invention claimed is:

1. A layered three-dimensional radiation position detector comprising: a light receiving element having a light receiving surface; and a layered stack of three or more two-dimensional scintillator arrays that are pixelated by optically discontinuous surfaces and stacked on the light receiving surface of the light receiving element, responses of scintillator elements detecting radiations being made identifiable on the light receiving surface to obtain a three-dimensional radiation detection position, wherein
the layers of the scintillator arrays are made of substantially a same scintillator material, and
a first layer of the scintillator arrays lying on a radiation incident surface side has a pixel pitch smaller than that of second and more layers of the scintillator arrays lying on a light receiving element side so that the first layer on the radiation incident surface side has increased resolution.

2. The layered three-dimensional radiation position detector according to claim 1, wherein the second and more layers of the scintillator arrays includes a plurality of scintillator arrays having a same pixel pitch.

3. The layered three-dimensional radiation position detector according to claim 1, wherein four layers of the scintillator arrays are stacked, and a first layer of the four layers on the radiation incident surface side has a pixel pitch smaller than that of remaining three layers of the scintillator arrays on the light receiving element.

4. The layered three-dimensional radiation position detector according to claim 3, wherein the first layer of the scintillator arrays is an array of 16×16 scintillator elements, and an optical reflective material is inserted for every 4×4 scintillator elements.

5. The layered three-dimensional radiation position detector according to claim 4, wherein the second to fourth layers of the scintillator arrays are configured by a stack of three layers of arrays of 8×8 scintillator elements having a size twice that of the scintillator elements of the first layer.

6. The layered three-dimensional radiation position detector according to claim 1, wherein a light guide is inserted between the first layer and the second layer of the scintillator arrays between which the pixel pitch changes, so that scintillation light from the first layer spreads through the second layer.

7. The layered three-dimensional radiation position detector according to claim 1, wherein the first layer of the scintillator arrays on has a pixel pitch 1/n (n is a natural number of 2 or greater) of that of the second and more layers of the scintillator arrays in a longitudinal direction and/or a lateral direction.

8. The layered three-dimensional radiation position detector according to claim 1, wherein a radiation incident position on the first layer of the scintillator arrays is made identifiable on the light receiving surface by a layout pattern of an air gap and/or an optical adhesion layer.

* * * * *